(12) United States Patent
Shimada

(10) Patent No.: US 9,191,473 B2
(45) Date of Patent: Nov. 17, 2015

(54) MOBILE TERMINAL AND TOUCH PANEL OPERATING METHOD

(75) Inventor: Kenji Shimada, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/114,178

(22) PCT Filed: Apr. 12, 2012

(86) PCT No.: PCT/JP2012/059973
§ 371 (c)(1),
(2), (4) Date: Oct. 25, 2013

(87) PCT Pub. No.: WO2012/147522
PCT Pub. Date: Nov. 1, 2012

(65) Prior Publication Data
US 2014/0045553 A1 Feb. 13, 2014

(30) Foreign Application Priority Data

Apr. 26, 2011 (JP) ................ 2011-097919

(51) Int. Cl.
*H04M 1/02* (2006.01)
*G06F 3/041* (2006.01)
*G06F 3/0481* (2013.01)
*G06F 1/16* (2006.01)
*H04M 1/725* (2006.01)

(52) U.S. Cl.
CPC ........... *H04M 1/0266* (2013.01); *G06F 1/1613* (2013.01); *G06F 3/041* (2013.01); *G06F3/04817* (2013.01); *G06F 2203/04804* (2013.01); *H04M 1/0214* (2013.01); *H04M 1/72519* (2013.01); *H04M 2250/22* (2013.01)

(58) Field of Classification Search
CPC .............. G06F 2200/1637; G06F 2203/04101; G06F 2203/04105; G06F 3/016; G06F 3/03545; G06F 3/0416; G06F 3/0481; G06F 3/04817; G06F 3/0482; G06F 3/0485; G06F 3/0489; G06F 3/1438
USPC .......................... 345/1.1–1.3, 156, 173–179; 178/18.01–18.09; 455/566
See application file for complete search history.

(56) References Cited

U.S. PATENT DOCUMENTS 8,810,524 B1 * 8/2014 Rosenberg et al. ........... 345/173
2008/0119731 A1 * 5/2008 Becerra et al. ................ 600/437
(Continued)

FOREIGN PATENT DOCUMENTS

| JP | 2001-045124 A | 2/2001 |
| JP | 2010-044533 A | 2/2010 |
| JP | 2010-154090 A | 7/2010 |
| JP | 2011-076233 A | 4/2011 |

OTHER PUBLICATIONS

International Search Report dated Jul. 10, 2012, issued for International Application No. PCT/JP2012/059973.

*Primary Examiner* — MD Saiful A Siddiqui
(74) *Attorney, Agent, or Firm* — Procopio, Cory, Hargreaves & Savitch LLP

(57) ABSTRACT

[Structure] A mobile phone 10 is provided with a transparent display 30 and a first touch panel 38a is provided at a front side of the transparent display 30, and a second touch panel is provided on a rear side. A plurality of first function key (FK) and a second function key (BK) to each of which a function is made to correspond are displayed on the transparent display 30. The first function key (FK) and the second function key (BK) are the same in a size and coordinates of a key coordinates range (TA). It is possible for a user to respectively perform a touch operation to the first function key (FK) and the second function key (BK) by using two different touch panels 38 provided on the both sides (front and rear) of the transparent display 30.

4 Claims, 7 Drawing Sheets

(56) References Cited

U.S. PATENT DOCUMENTS

| | | |
|---|---|---|
| 2010/0037183 A1 | 2/2010 | Miyashita et al. |
| 2010/0056220 A1* | 3/2010 | Oh et al. .................. 455/566 |
| 2010/0166404 A1* | 7/2010 | Lombardi .................. 396/89 |
| 2010/0277439 A1 | 11/2010 | Charlier et al. |
| 2011/0074716 A1 | 3/2011 | Ono |
| 2011/0163986 A1* | 7/2011 | Lee et al. .................. 345/173 |
| 2011/0312349 A1* | 12/2011 | Forutanpour et al. ......... 455/466 |

* cited by examiner

US 9,191,473 B2

MOBILE TERMINAL AND TOUCH PANEL OPERATING METHOD

FIELD OF ART

The present invention relates to a mobile terminal and a touch panel operating method, and more specifically, a mobile terminal capable of being operated by a touch panel, and a touch panel operating method.

BACKGROUND ART

An example of a mobile terminal capable of being operated by a touch panel is disclosed in Patent Literature 1. In a mobile terminal in Patent Literature 1, a grasped position can be determined by sensors provided on left and right side surfaces and a rear surface, and a displaying area for a key to be displayed on a touch-display is decided in accordance with the grasped position that is determined.

Furthermore, in a mobile phone in Patent Literature 2, a plurality of keys are displayed on an inputting/displaying portion composed of a touch panel and an LCD, and a user can input information by depressing a portion corresponding to a specific key.

Patent Literature 1: Japanese Patent Application Laying-open No. 2010-154090 [H04N 1/00]

Patent Literature 2: Japanese Patent Application Laying-open No. 2001-45124 [H04M 1/02, G06G 1/16]

SUMMARY OF THE INVENTION

Problem to be Solved by the Invention

In any one of the mobile terminal of Patent Literature 1 and the mobile phone of Patent Literature 2, there is a limit in a range for displaying a key. Accordingly, if a displaying size of a key is made larger, an operability of the key improves, but the number of the keys capable of being displayed decreases. In contrast, if the displaying size of the key is made smaller, the number of the keys increases, but the operability of the key decreases. Thus, in the mobile terminal of Patent Literature 1, the mobile phone of Patent Literature 2 and so on, an operability of a touch panel which is provided for a key operation is not satisfactory.

Therefore, it is a primary object of the invention to provide a novel mobile terminal and touch panel operating method.

It is another object of the invention to provide a mobile terminal and a touch panel operating method, capable of increasing an operability of a touch panel.

Means for Solving the Problem

The present invention employs following features in order to solve the above-described problems. It should be noted that reference numerals and the supplements inside the parentheses show one example of a corresponding relationship with the embodiments described later for easy understanding of the present invention, and do not limit the present invention.

A first aspect of the invention is a mobile terminal comprising: a transparent display; a first touch panel that is provided on the display; a second touch panel that is provided on a rear side opposite to a side that the first touch panel is provided; a detecting module operable to detect a touch operation to the first touch panel or the second touch panel; a first performing module operable to perform a first function if and when the touch operation is made to the first touch panel; and a second performing module operable to perform a second function if and when the touch operation is made to the second touch panel.

In the first aspect according to the invention, the mobile terminal (10: a reference numeral exemplifying a corresponding module in the embodiment, and so forth) is provided with the display (30) that is transparent in a state that nothing is displayed, and therefore, it is possible to look at a rear through the display. The first touch panel (38*a*) is provided on a front side of the display, and on a rear side thereof, the second touch panel (38*b*) is provided, for example. The detecting module (36) detects a touch operation to the first touch panel and the second touch panel that are provided on the front side and the rear side of the display, respectively. The first performing module (24, S31) performs the first function (a telephone function, etc., for example) if and when the touch operation is made to the first touch panel provided on the front side of the display. In contrast, the second performing module (24, S35) performs the second function (a map function, etc., for example) if and when the touch operation is made to the second touch panel provided on the rear side of the display.

According to the first aspect of the invention, by providing touch panels on both sides of the display, it is possible to increase an operability of each touch panel.

A second aspect of the invention is a touch panel operating method in a mobile terminal (10) which comprises a transparent display (30); a first touch panel (38*a*) provided on the display; a second touch panel (38*b*) that is provided on a rear side; and a detecting module (36) operable to detect a touch operation to the first touch panel or the second touch panel, comprising steps of: displaying (S21) a key (FK, BK) on the display; and at a time that a touch operation is made to the key, performing (S31, S35) a first function if and when the touch operation is made to the first touch panel or a second function if and when the touch operation is made to the second touch panel.

According to the sixth aspect, as well, by providing touch panels on both sides of the display, it is possible to increase the operability of each touch panel.

Advantages of the Invention

According to the present invention, by providing touch panels on both sides of the display, it is possible to increase an operability of each touch panel.

The above described objects and other objects, features, aspects and advantages of the present invention will become more apparent from the following detailed description of the present invention when taken in conjunction with the accompanying drawings.

FORMS FOR EMBODYING THE INVENTION

First Embodiment

Figure 1:
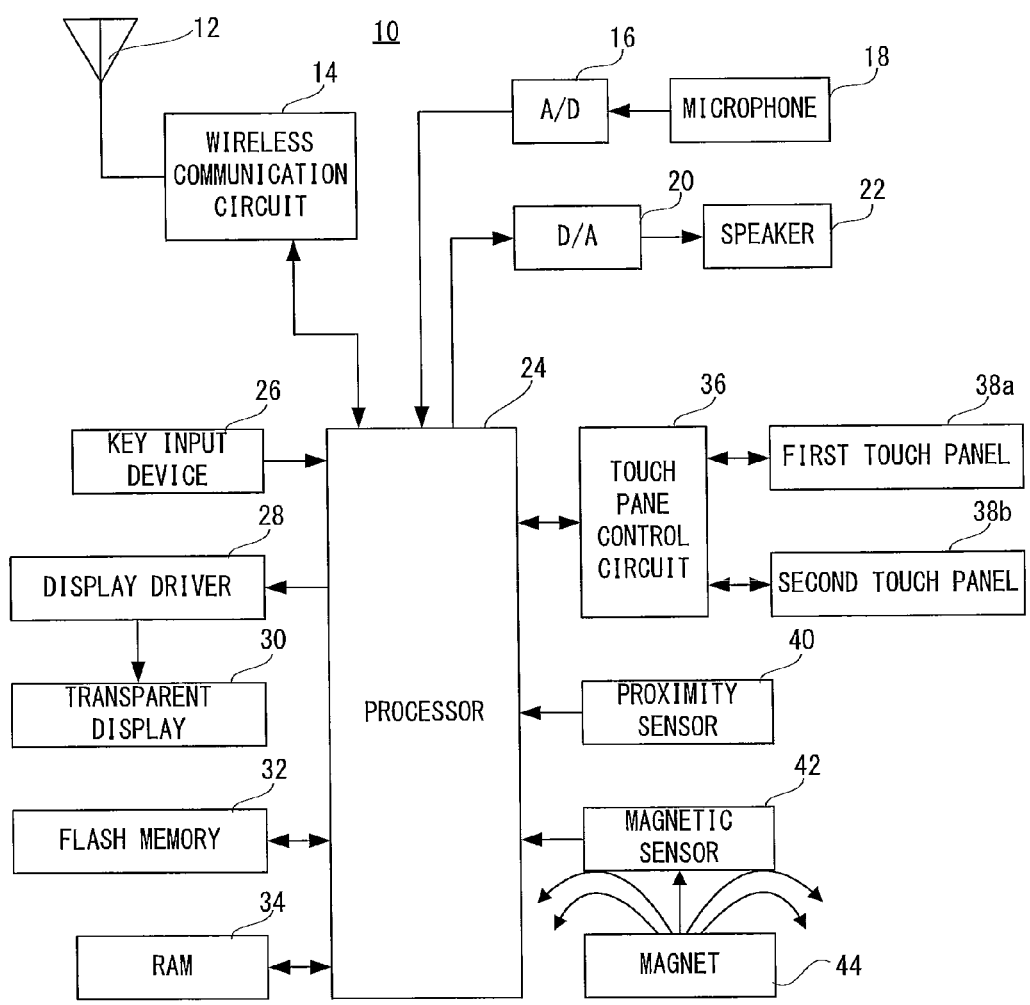
FIG. 1 is a view showing electrical structure of a mobile phone of an embodiment in accordance with the present invention.

With referring to FIG. 1, a mobile phone 10 is a kind of a mobile terminal, and includes a processor 24 that is called as a computer or CPU. The processor 24 is connected with a wireless communication circuit or module 14, an A/D converter 16, a D/A converter 20, a key input device 26, a display driver 28, a flash memory 32, a RAM 34, a touch panel control circuit or module 36, a proximity sensor 40, a magnetic sensor 42, etc. Furthermore, an antenna 12 is connected to the wireless communication circuit 14. The A/D converter 16 is connected with a microphone 18 and the D/A converter 20 is connected with a speaker 22. A transparent display 30 is connected to the display driver 28. A first touch panel 38a and a second touch panel 38b are connected to the touch panel control circuit 36. In addition, in a case where it is not necessary to distinguish between the first touch panel 38a and the second touch panel 38b, these are collectively called as "touch panel 38".

The processor 24 is in charge of a whole control of the mobile phone 10. The RAM 34 is used as a working area (including an image drawing area) and a buffer area for the processor 24. Data of applications, etc. are recorded in the flash memory 32.

The A/D converter 16 converts an analog sound signal of the voice or sound input through the microphone 18 into a digital sound signal. The D/A converter 20 converts (decodes) the digital sound signal into an analog sound signal and applies the analog sound signal to the speaker 22 via an amplifier not shown. Therefore, a voice or sound corresponding to the analog sound signal is output from the speaker 22. The processor 24 can adjust a volume of the voice that is output from the speaker 22 by controlling an amplification factor by the amplifier.

The key input device 26 includes a call key, an end key, a menu key, etc. Information (key data) of the key that is operated by a user is input to the processor 24.

The display driver 28 controls the displaying of the transparent display 30 connected to this display driver 28 under instructions by the processor 24. In addition, the display driver 28 includes a video memory (not shown) that temporarily stores image data to be displayed.

Since a displaying surface of the transparent display 38 is transparent, it is possible for the user to look at a rear through the transparent display 38 in a state that nothing is displayed. Even if a character, icon or the like is being displayed on the transparent display 30, it is also possible to look at the rear in a place that these are not being displayed. In addition, a side that a character, icon or the like being displayed can be recognized is called as "front side" in the transparent display 30 of this embodiment, and a side opposite thereto is called as "rear side".

The touch panel 38 is of an electrostatic capacitance system that detects a change of an electrostatic capacitance between electrodes, which occurs when an object such as a finger is in close to a surface of the touch panel. The first touch panel 38a is provided on the front side of the transparent display 30 and the second touch panel 38a is provided on the rear side of the transparent display 30. Accordingly, the first touch panel 38a is a pointing device for designating an arbitrary position within the displaying on the front side of the transparent display 30, and the second touch panel 38b is a pointing device for designating an arbitrary position on the rear side of the transparent display 30.

Furthermore, if and when a touch operation that a touch surface is pushed, stroked or contacted by a finger is performed, the touch panel 38 detects such a touch operation. The touch panel control circuit 36 identifies a touch position if and when a finger or the like is brought into contact with the touch panel 38, and outputs coordinates data representing the touch position to the processor 24. Then, the touch panel control circuit 36 adds information representing "front side" to the coordinates data to be output if and when a touch operation is made to the first touch panel 38a. Information representing "rear side" is added to the coordinates data to be output if and when a touch operation is made to the second touch panel 38b. The coordinates data can be represented by (x, y, z), for example, and "x, y" indicate positions in the vertical direction and the horizontal direction, and "z" indicates a front or rear. As for "z", "1 (front)" or "0 (rear)" can be set.

Thus, the user can input an operating direction, a figure, etc. to the mobile phone 10 by pushing, stroking or contacting the surface of the touch panel 38 with his/her finger.

Here, an operation that a user touches with his/her finger an upper surface of the touch panel 38 is called as "touch". On the other hand, an operation that the user releases the finger from the touch panel 36 is called as "release". An operation that the user strokes the surface of the touch panel 36 is called as "slide". The touch operation in this embodiment includes the touch, release, slide, etc. In addition, coordinates indicated by the touch are called as "touch point" (a touch start position), and coordinates indicated by the release are called as "release point" (a touch end position).

In addition, a touch operation is not limited to an operation by a finger, may be performed by a touch pen that an electric conductor is attached at a tip end thereof, or the like. Furthermore, for a detection system of the touch panel 38, a surface-type electrostatic capacitance system may be adopted, or a resistance film system, an ultrasonic system, an infrared ray system, an electromagnetic induction system or the like may be adopted.

The proximity sensor 40 is a touch sensor of an electrostatic capacitance system, and a proximity (contact) of a finger, face or the like of the user is detected by a change in the electrostatic capacitance. In addition, in another embodiment, as the proximity sensor 40 that uses the touch sensor of the electrostatic capacitance system, it is possible to use a projection type that a proximity of a finger can be sensed by measuring a ratio of electric current amounts according to a number of electrode patterns, a surface type that is constructed to have an electric conductive film and a substrate, and senses a proximity of a finger by forming an even electric field by the electric conductive film, and so on. Furthermore, in another embodiment, a proximity sensor that utilizes a photodiode may be adopted. In this case, the proximity sensor senses the proximity of the finger, face or the like of the user by a change in a light amount.

The magnetic sensor 42 detects a magnetism that is emitted by the magnet 44 or the like. Then, the processor 24 determines an "opened state" or a "closed state" both described later based on an output of the magnetic sensor 42.

The wireless communication circuit 14 is a circuit for performing a wireless communication with a CDMA system. If and when the user designates a telephone call using the key input device 26, for example, the wireless communication circuit 14 performs the telephone call processing under instructions from the processor 24 and outputs a telephone call signal via the antenna 12. The telephone call signal is transmitted to a telephone at the other end of the line through a base station and a communication network (not shown). Then, when the incoming processing is performed in the telephone at the other end of the line, a communication-capable state is established and the processor 24 starts the telephone communication processing.

Describing specifically the normal telephone communication processing, a modulated sound signal sent from a telephone at the other end of the line is received by the antenna 12. The modulated sound signal that is received is subjected to the demodulation processing and the decode processing by the wireless communication circuit 14. A received sound signal obtained through such processing is converted into an analog sound signal by the D/A converter 20 to be output from the speaker 22. On the other hand, a sending sound signal taken-in through the microphone 18 is converted into a digital sound signal by the A/D converter 16 to be applied to the processor 24. The sending sound signal which is converted into the digital sound signal is subjected to the encode processing and the modulation processing by the wireless communication circuit 14 under instructions by the processor 24 to be output via the antenna 12. Therefore, the sound signal that is modulated is transmitted to the telephone at the other end of the line via the base station and the communication network.

If and when the telephone call signal from a telephone at the other end of the line is received by the antenna 12, the wireless communication circuit 14 notifies the processor 24 of the incoming call. In response thereto, the processor 24 displays on the transparent display 30 sender information (telephone number and so on) described in the incoming call notification by controlling the display driver 28. In addition, at the approximately same time, the processor 24 causes the speaker (not shown) to output a ringtone (may be also called as a ringtone melody, a ringtone voice).

Then, if and when the user performs a responding operation by using the call key, the wireless communication circuit 14 performs the incoming call processing under instructions by the processor 24, whereby the communication-capable state is established, and the processor 24 performs the above-described normal telephone communication processing.

If and when the telephone communication ending operation is performed by the end key after a state is changed to the communication-capable state, the processor 24 transmits the telephone communication ending signal to the telephone at the other end of the line by controlling the wireless communication circuit 14. Then, after the transmission of the telephone communication ending signal, the processor 24 terminates the telephone communication processing. Furthermore, in a case where the telephone ending signal from the telephone at the other end of the line is first received, the processor 24 also terminates the telephone communication processing. In addition, in a case where the telephone communication ending signal is received from the mobile communication network not from the telephone at the other end of the line, the processor 24 also terminates the telephone communication processing.

In addition, the mobile phone 10 can perform, other than a telephone function, a mailing function that sends and receives a mail, an address function that manages telephone numbers and mail address, a browsing function for browsing a website (HP), etc., a map function that acquires map data from a server and displays a map, a memo pad function for editing a text, an electronic calculator function that the mobile phone is utilized as an electronic calculator, an alarm function that notifies the user of a time that is set by a sound or a vibration, etc.

Figure 2:
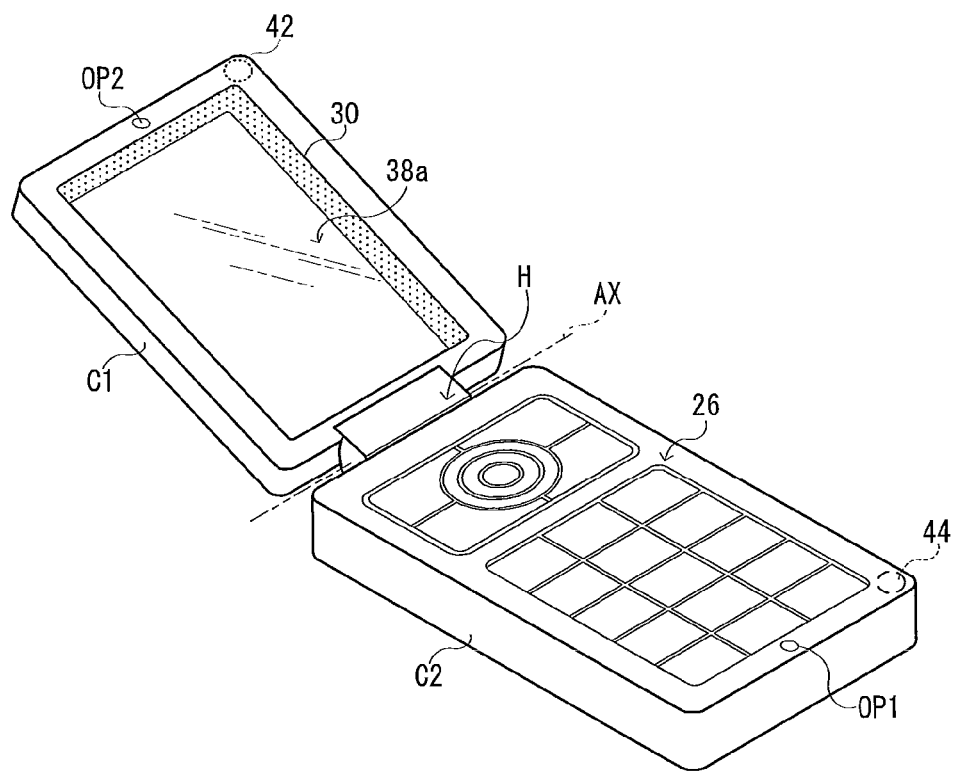
FIG. 2 is a view showing an example of an appearance of a first embodiment of the mobile phone shown in FIG. 1.
Figure 3:
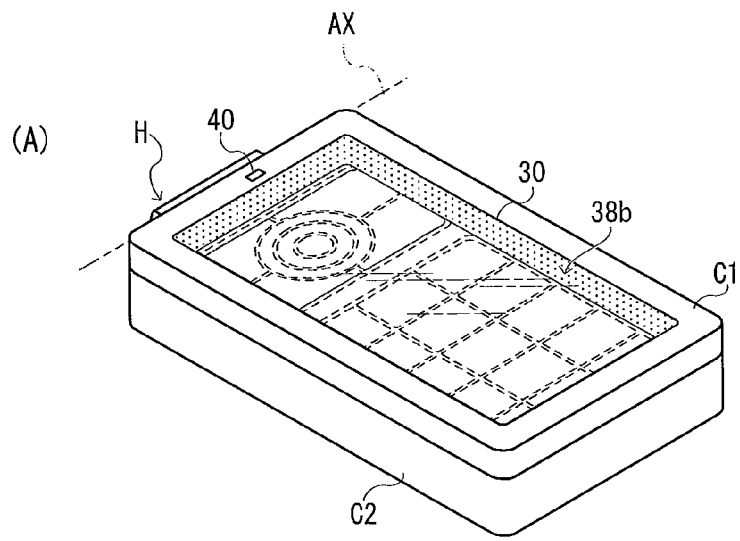
FIG. 3 is a view showing another example of an appearance of the mobile phone shown in FIG. 1.

FIG. 2 is a view showing an appearance of the mobile phone 10 in its opened state. FIGS. 3(A) and 3(B) are views showing the appearance of the mobile phone 10 in its closed state. With referring to FIG. 2, the mobile phone 10 has a first housing C1 and a second housing C2 each being a rectangle in plane.

The microphone 16 (not shown) is housed within the second housing C2, and an opening OP1 that is communicated with the microphone 16 is provided on an inner side surface at one end in a longitudinal direction of the second housing C2. The speaker 18 (also not shown) is housed within the first housing C1, and an opening OP2 that is communicated with the speaker 18 is provided on an inner side surface at one end in the longitudinal direction of the first housing C1.

A plurality of keys included in the key input device 26 are provided at the inner side of the second housing C2. The key input device 26 includes a cross-key, a calling key, an end key, a menu key, a ten-key, etc., for example. The transparent display 30 is mounted to the first housing C1 in such a manner that a glass plate is fit in a pane. The first touch panel 38a is provided at the front side of the transparent display 30. In addition, in a state that the transparent display 30 is being fit, a displayed content is visible from an inner side surface of the first housing C1, but invisible from an outer side surface thereof.

For example, the user can input a telephone number by operating the ten-key and perform a calling operation by the call key while the user is confirming the transparent display 30. Then, the user performs the telephone communication ending operation by the end key. The user can also make the menu screen displayed by operating the menu key, and then, select an arbitrary menu by the cross-key. The user can turn a power of the mobile phone 10 on or off by long-depressing the end key. Then, if and when the end key is short-depressed, an image that indicates a standby state is displayed on the transparent display 30, and thus, the mobile phone 10 is brought into the standby state.

Furthermore, the magnetic sensor 42 is housed at the upper right corner of the first housing C1, and the magnet 44 is housed at the lower right corner of the second housing C2. Then, in the closed state, the magnet 44 becomes nearest the magnetic sensor 42. Accordingly, since a value that the magnetic sensor 42 outputs becomes largest in the closed state, it is determined that the mobile phone 10 is in the closed state. In contrast, the value that the magnetic sensor 42 outputs is decreased as the mobile phone is shifted from the closed state to the opened state. Then, if and when the value that is output from the magnetic sensor 42 becomes equal to or less than a threshold value, it is determined that the mobile phone 10 is being in the opened state.

The first housing C1 and the second housing C2 are coupled to each other by a hinge mechanism H. The hinge mechanism H is formed on a side surface at the other end in the longitudinal direction of the first housing C1. The second housing C2 is coupled to the hinge mechanism H on a side surface at the other end in the longitudinal direction thereof. The hinge mechanism H makes the first housing C1 movable with respect to the second housing C2 centering on an axis AX that is in parallel with a shorter side of the first housing C1. That is, the first housing C1 and the second housing C2 are opened from or closed to each other though a rotation centering on the axis AX. Furthermore, the hinge mechanism H includes an assist mechanism for keeping the first housing C1 at an arbitrary angle in the opened state.

FIG. 3(A) is a view showing a front appearance of the mobile phone 10 in the closed state, and FIG. 3(B) is a view showing a rear appearance of the mobile phone 10 in the opened state. With referring to FIGS. 3(A) and 3(B), the second touch panel 38b is provided at a rear side of the transparent display 30 that is fit to the first housing C1. In addition, the proximity sensor 40 is provided in the vicinity of the hinge mechanism H of the first housing C1.

In addition, the antenna 12, the wireless communication circuit 14, the A/D converter 16, the D/A converter 20, the processor 24, the display driver 24, the flash memory 32, the RAM 34, the touch panel control circuit 36, etc. are housed in the first housing C1 or the second housing C2, and not shown in FIG. 2 and FIGS. 3(A) and 3(B).

Figure 4:
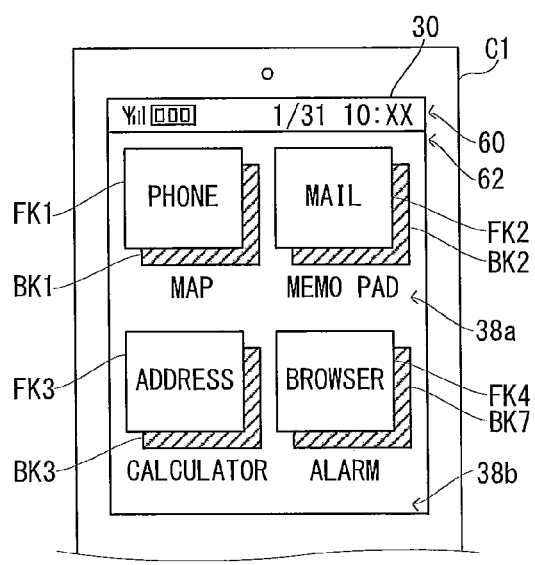
FIG. 4 is a view showing an example of a menu screen that is displayed on a display shown in FIG. 1.

FIG. 4 is a view showing a state that a menu screen is being displayed on the transparent display 30 of the mobile phone 10. A displaying area of the transparent display 30 includes a status displaying area 60 including icons that show a date and time, a residual amount of a battery, a reception state, etc., and a function displaying area 62 that the menu screen is displayed. In the menu screen that is displayed in the function displaying area 62, a telephone function key FK1, a mail function key FK2, an address function key FK3, a browser function key FK4 as well as a map function key BK1, a memo pad function key BK2, an electronic calculator function key BK3 and an alarm function key BK4 are included.

Figure 5:
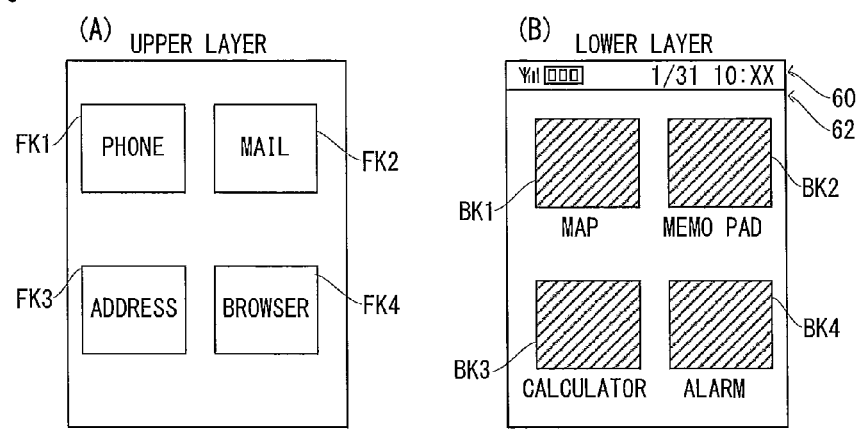
FIG. 5 is a view showing an example of a layer that is utilized for displaying of the menu screen shown in FIG. 4.

The displaying of the transparent display 30 is performed by utilizing a plurality of layers. With referring to FIGS. 5(A) and 5(B), for example, the menu screen is displayed by laying two layers (an uppermost layer, a lowermost layer) on one another, and in a virtual space, the uppermost layer is provided at a side of a viewpoint (a side of the user), and the lowermost layer is arranged in a direction departing from the viewpoint. On the uppermost layer shown in FIG. 5(A), the telephone function key FK1, the mail function key FK2, the address function key FK3 and the browser function key FK4 are depicted. On the lowermost layer shown in FIG. 5(B), the map function key BK1, the memo pad function key BK2, the electronic calculator function key BK3 and the alarm function key BK4 are depicted. In addition, on the lowermost layer, the icons of the status displaying area 60 are also depicted.

In addition, the menu screen may be displayed by utilizing three or more layers. In a case where a screen other than the menu screen is to be displayed on the transparent display 30, nothing may be depicted on the uppermost layer.

Furthermore, in the following description, the keys that are depicted on the uppermost layer in the menu screen are collectively called as "a first function key FK" and the keys that are depicted on the lowermost layer in the menu screen are collectively called as "a second function key BK".

Then, in this embodiment, by displaying a character string showing a function associated with the second function key BK in the vicinity (a lower side) of the second function key BK, it is intended that the user can clearly recognize a function that is made to correspond to the second function key BK; however, in another embodiment, the character string may be displayed within the second function key.

Figure 6:
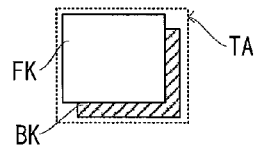
FIG. 6 is a view showing an example of a key coordinates range of a first function key and a second function key that are depicted in the menu screen shown in FIG. 4.

FIG. 6 is a view showing a key coordinates range TA of the first function key FK and the second function key BK. The key coordinates range TA means an effective range for a touch operation to the key. That is, it is possible for the user to perform a function associated with the corresponding key by performing a touch operation within the key coordinates range TA.

With referring to FIG. 6, in the first embodiment, the key coordinates range TA of the first function key FK and the second function key BK has an identical size and an identical coordinates range. In a case where a function corresponding to the first function key FK is to be performed, the user may perform a touch operation within the key coordinates range TA on the first touch panel 38a, and in a case where a function corresponding to the second function key FK is to be performed, the user may perform a touch operation within the key coordinates range TA on the second touch panel 38b. That is, it is possible for the user to respectively perform a touch operation to the first function key FK and the second function key BK that are displayed in the menu screen by using two different touch panels 38 provided on the both sides (front and rear) of the transparent display 30.

Figure 7:
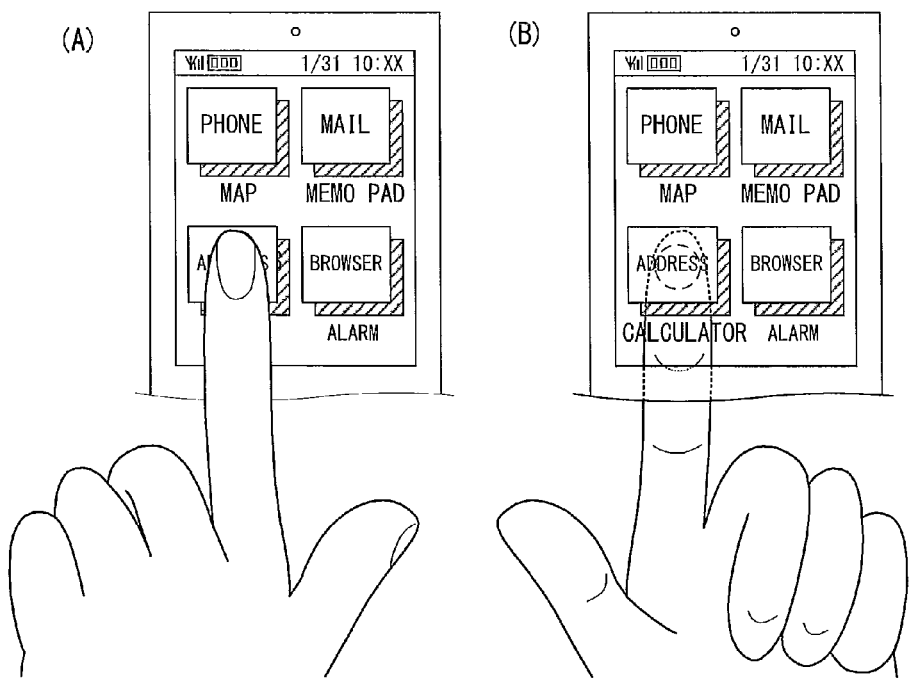
FIG. 7 is a view showing a touch operation to the first function key or the second function key shown in FIG. 4.

With referring to FIG. 7(A), for example, if and when a touch operation is performed in the key coordinates range TA of the address function key FK3 and the electronic calculator function key BK3 from the front side of the transparent display 30 (the first touch panel 38a), the address function is performed. On the other hand, with referring to FIG. 7(B), if and when a touch operation is performed in the key coordinates range TA of the address function key FK3 and the electronic calculator function key BK3 from the rear side of the transparent display 30 (the second touch panel 38b), the electronic calculator function is performed.

Even if a plurality of keys are displayed in a narrower displaying range, by using two touch panels 38 provided on the both sides of the transparent display 30, an operability of each key can be thus increased. Especially, in the first embodiment, a side that a touch operation is made can be determined, and therefore, the user can perform an arbitrary function even if two functions are associated with a single key coordinates range.

Furthermore, in a case where the user holds the mobile phone 10 in a manner that an outer side surface of the first housing C1 is covered and hidden, it is apprehensive about an erroneous operation to the second function key BK. Then, in the embodiment shown, if and when a proximity of a hand of the user is sensed by the proximity sensor 40 that is provided on the outer side surface of the first housing C1, a touch operation to the second function key BK is made invalid. Accordingly, it is possible to prevent an erroneous operation even if the mobile phone 10 is held in a state having a higher possibility that an erroneous operation occurs.

Furthermore, by displaying the first function key FK and the second function key BK so as to have a depth, it is possible to make the user to intuitively recognize a surface (direction) that the key to be touch-operated.

Furthermore, by providing the touch panels 38 on the both surface sides of the transparent display 30, an operability of each touch panel 38 can be increased.

Figure 8:
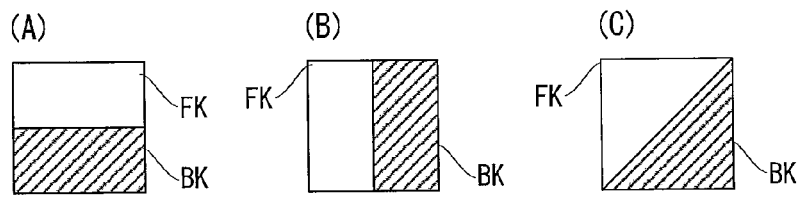
FIG. 8 is a view showing other examples of the first function key and the second function key shown in FIG. 4.

In addition, in another embodiment, the first function key FK and the second function key BK may be depicted without a depth. As shown in FIG. 8(A), for example, the first function key FK may be depicted in an upper side and the second function key BK may be depicted in a lower side. Furthermore, as shown in FIG. 8(B), the first function key FK may be depicted in a left side and the second function key BK may be depicted in a right side, and as shown in FIG. 8(C), the first function key FK may be depicted at an upper left and the second function key BK may be depicted at a lower right.

In a case of each of FIGS. 8(A)-8(C), a depicting range of each key may be coincident with a key coordinates range TA. In such a case, even if a key coordinates range TA for the first function key FK is touch-operated from the rear side, a function associated with the first function key FK is not performed.

Furthermore, a key that is displayed in the menu screen may be only a first function key FB. In such a case, two functions are associated with the single first function key FB. In a case where a telephone function and a map function are associated with the single first function key FB, for example, if and when a touch operation is performed to the key by using the first touch panel 38a, the telephone function is performed, but, if and when a touch operation is performed to the key by using the second touch panel 38b, the map function is performed.

Furthermore, in each of the first function key FK and the second function key BK, five or more keys may be included not only four keys shown in FIG. 4.

Figure 9:
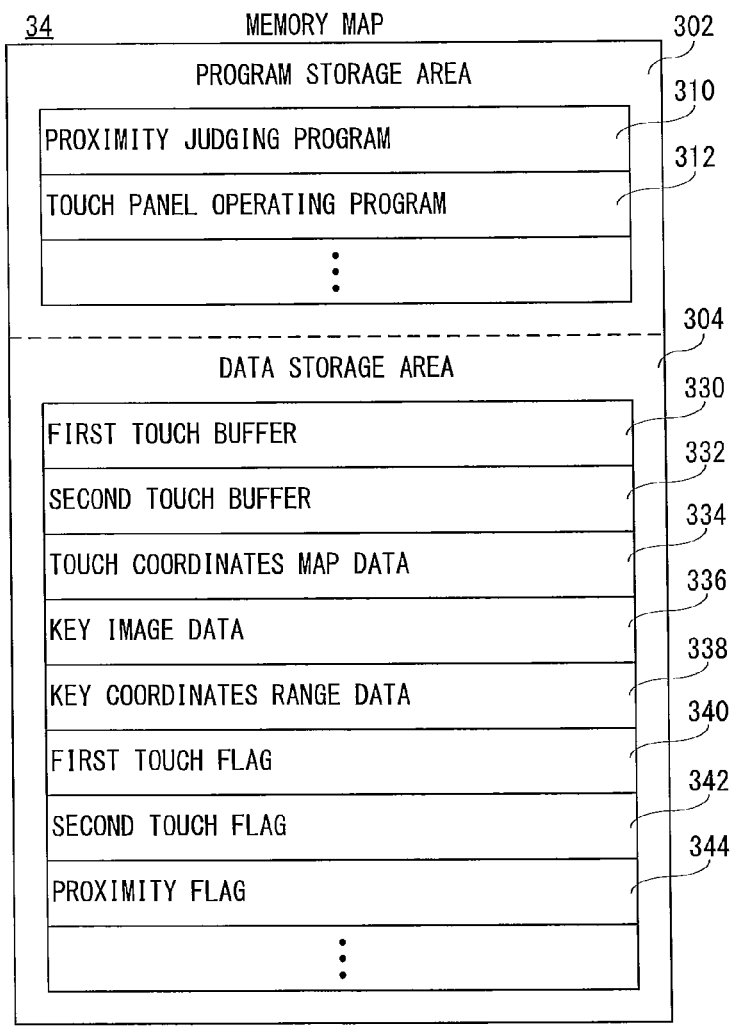
FIG. 9 is a view showing an example of a memory map of a RAM shown in FIG. 1.

FIG. 9 is a view showing a memory map of the RAM 30. The RAM 34 includes a program storage area 302 and a data storage area 304. Furthermore, parts of programs and data are wholly read at once or partly and sequentially read as necessarily, and processed by the processor 24 after stored in the RAM 34.

The program storage area 302 is stored with programs for operating the mobile phone 10. The programs for operating the mobile phone 10 include a proximity determining program 310 and a touch panel operating program 312, for example.

The proximity determining program 310 is a program for switching an on/off of a proximity flag 344 described later based on an output of the proximity sensor 40. The touch panel operating program 312 is a program for determining a touch panel 38 that a touch operation is performed. Furthermore, at a time that this program is being executed, if and when it is determined that a position of the touch operation is included in the key coordinates range, a function associated with a key that is touch-operated is performed.

In addition, although not shown, the programs for operating the mobile phone 10 further include a program corresponding to an electronic calculator function, a program for establishing a communication with external equipment (a server or the like) via a network, etc.

The data storage area 304 is provided with a first touch buffer 330 and a second touch buffer 332, and stored with touch coordinates map data 334, key image data 336 and key coordinates range data 338. Furthermore, the data storage area 304 is provided with a first touch flag 340, a second touch flag 342, a proximity flag 344, etc.

Into the first touch buffer 330 or the second touch buffer 332, touch coordinates showing a touch point, a release point and a current touch position of a touch operation to the first touch panel 38a or the second touch panel 38b, etc. are stored.

The touch coordinates map data 334 is data for converting the coordinates saved in the first touch buffer 330 or the second touch buffer 332 into displaying coordinates for the transparent display 30. The key image data 336 is image data for depicting the first function key FK, the second function key BK, etc. The key coordinates range data 338 is data indicating each key coordinates range TA of each of the first function key FK and the second function key BK that are displayed in the menu screen. A function is associated with each key coordinates range TA that is included in the key coordinates range data 338, and therefore, the key coordinates range data 338 is used for not only determining whether a touch operation to each key is valid or invalid but also deciding a function to be performed.

The first touch flag 340 is a flag for determining whether the first touch panel 38a is touched. The first touch flag 340 is constructed by a 1-bit register, for example. If and when the first touch flag 340 is turned-on (true), a data value "1" is set in the register, and if and when the first touch flag 340 is turned-off (false), a data value "0" is set in the register. In addition, the first touch flag 340 is switched on/off based on a signal that the touch panel control circuit 36 outputs.

The second touch flag 342 is a flag for determining whether the second touch panel 38b is touched. Furthermore, the proximity flag 344 is a flag for determining whether the proximity sensor 40 senses a proximity of a hand or face. Then, on/off of the proximity flag 344 is switched through the processing of the proximity determining program 310.

In addition, structure of the second touch flag 342 and the proximity flag 344 are the same as that of the first touch flag 340, and therefore, a detailed description thereof is omitted here.

Although not shown, the data storage area 304 is further stored with image data that is displayed in a standby state, data of a character string, etc., and provided with counters and flags necessary for the operation of the mobile phone 10.

Figure 10:
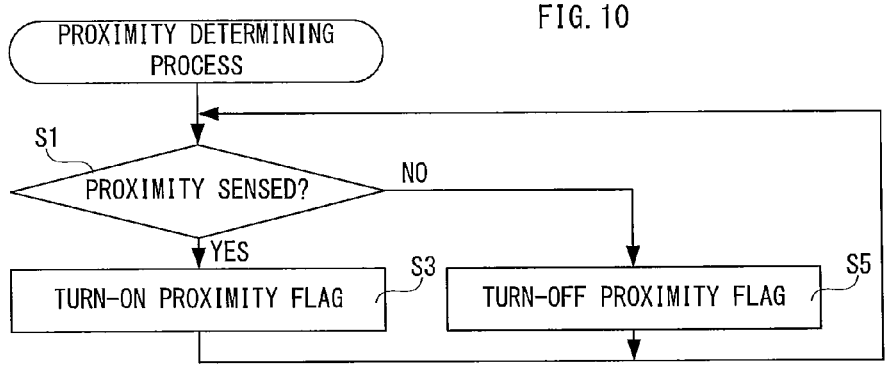
FIG. 10 is a flowchart showing an example of a proximity determining process by a processor shown in FIG. 1.
Figure 11:
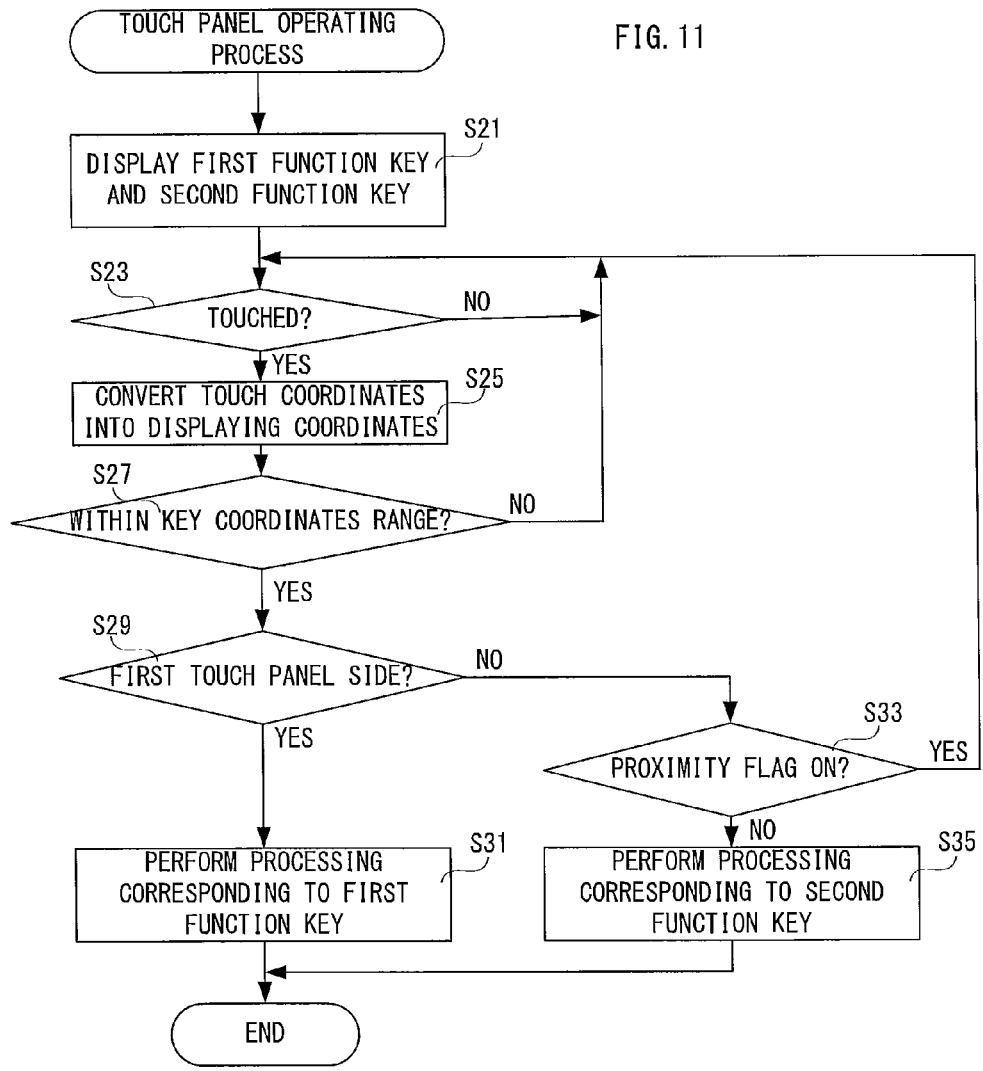
FIG. 11 is a flowchart showing an example of a touch panel operating process by the processor shown in FIG. 1.

The processor 24 processes a plurality of tasks including a proximity determining process shown in FIG. 10, a touch panel operating process shown in FIG. 11, etc. in parallel with each other under controls by Linux (registered trademark)-base OS such as Android (registered trademark) and REX or other OSs.

FIG. 10 is a flowchart of a proximity determining process. When a power of the mobile phone 10 is turned-on, for example, in a step S1, the processor 24 determines whether a proximity is sensed. That is, it is determined whether a value that is output from the proximity sensor 40 is changed. If and when "YES" is determined in the step S1, that is, if and when a proximity of a finger, for example, is sensed, the proximity flag 344 is turned-on in a step S3, and the process returns to the step S1. In contrast, if and when "NO" is determined in the step S1, that is, if no proximity of a finger, for example, is sensed, the proximity flag 344 is turned-off in a step S5, and the process returns to the step S1. In addition, the processor 24 performing the processing in the step S3 functions as an invalidating module.

FIG. 11 is a flowchart of a touch panel operating process. If and when an operation for displaying menu screens is performed, the first function key FK and the second function key BK are displayed in a step S21. As shown in FIG. 4, for example, the telephone function key FK1, the map function key BK1, etc. are displayed on the transparent display 30. In addition, the processor 24 performing the processing in the step S21 functions as a key displaying module.

Subsequently, in a step S23, it is determined whether a touch is made. That is, it is determined whether a touch operation is performed to the touch panel 38 and thus whether the first touch flag 340 or the second touch flag 342 is turned-on. If and when "NO" is determined in the step S23, that is, if no touch operation is performed to the touch panel 38, the processing in the step S23 is repeated.

If and when "YES" is determined in the step S23, that is, if and when a touch operation is performed to the touch panel 38, in a step S25, the touch coordinates is converted into the displaying coordinates. That is, the touch coordinates saved in the first touch buffer 330 or the second touch buffer 332 is converted into the displaying coordinates for the transparent display 30 based on the touch coordinates map data 334. Subsequently, in a step S27, it is determined whether the touch operation is included in the key coordinates range TA. That is, it is determined whether the displaying coordinates that is converted through the processing in the step S25 is included in the key coordinates range TA that is included in the key coordinates range data 338. If and when "NO" is determined in the step S27, that is, if and when the touch operation is made to a position that the first function key FK and the second function key BK are not being displayed, the process returns to the step S23.

Furthermore, if and when "YES" is determined in the step S27, that is, if and when the displaying coordinates that is converted is included in the key coordinates range TA of the address function key FK3 or the electronic calculator function key BK3, for example, it is determined whether the touch operation is at a side of the first touch panel 38a in a step S29. That is, it is determined whether the first touch flag 340 is turned-on. If and when "YES" is determined in the step S29, that is, if and when the touch operation is performed to the first touch panel 38a, in a step S31, the processing corresponding to the first function key FK is performed, and then, the touch panel operating process is terminated. That is, based on the key coordinates range data 338, a function associated with the key coordinates range TA of the key that is touch-operated is performed. In addition, the processor 24 performing the processing in the step S31 functions as the first performing module.

If and when "NO" is determined in the step S29, that is, if and when the touch operation is made to the second touch panel 38b, in a step S33, it is determined whether the proximity flag 344 is turned-on. If and when "YES" is determined in the step S33, that is, if and when the proximity sensor 40 shown in FIG. 3(A) is covered and hidden by a hand of the user, for example, the process returns to the step S23 in order to make the touch operation to the second touch panel 38b invalid. In contrast, if and when "NO" is determined in the step S33, that is, if no proximity of a finger or the like is sensed by the proximity sensor 40, in a step S35, the processing corresponding to the second function key is performed, and then, the touch panel operating process is terminated. As shown in FIG. 7(B), for example, if and when the touch operation is performed to the electronic calculator function key BK3, the electronic calculator function is performed based on the key coordinates range data 338. Furthermore, the processor 24 performing the processing in the step S35 functions as the second performing module.

In addition, in a case where the end key is operated at a time that the touch panel operating process is being performed, the touch panel operating process is terminated with no relationship to the processing flow.

Second Embodiment

In the second embodiment, a shape of a mobile phone 10 is a straight type, and on a transparent display 30, a soft key having a QWERTY arrangement is displayed. In addition, since the mobile phone 10 of the second embodiment is the same or approximately the same as that of the first embodiment, a description of the memory map of the RAM 34 of the mobile phone 10, the flowchart, etc. is omitted here.

At first, since the mobile phone 10 of the second embodiment is a straight type, there are not an opened state and a closed state, and accordingly, the electric structure of the mobile phone 10 of the second embodiment does not include the magnetic sensor 42 and the magnet 44 both shown in FIG. 1.

Figure 12:
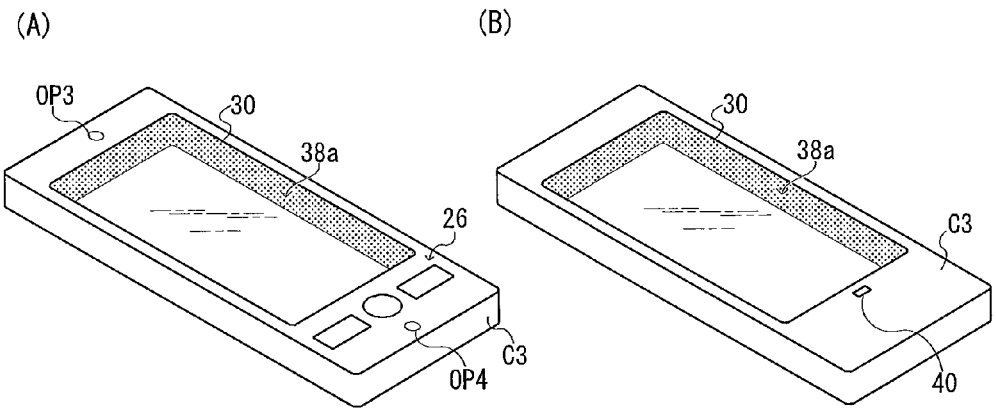
FIG. 12 is a view showing an example of an appearance of a second embodiment of the mobile phone shown in FIG. 1.

FIG. 12(A) is a view showing a front side appearance of the mobile phone 10 of the second embodiment, and FIG. 12(B) is a view showing a rear side appearance of the mobile phone 10 of the second embodiment. With referring to FIG. 12(A), the mobile phone 10 has a third housing C3 of a rectangle in plane. A microphone 18 not shown is housed in the third housing C3, and an opening OP4 that is communicated with the microphone 18 being housed is provided on a front side surface at one end in a longitudinal direction of the third housing C3. A speaker 22 not shown is also housed in the third housing C3, and an opening OP3 that is communicated with the speaker 22 being housed is provided on the front side surface at the other end in the longitudinal direction of the third housing C3. As similar to the first embodiment, a transparent display 30 is fit into the third housing C3. Therefore, in such a state, a displayed content on the transparent display 30 is visible from the front side surface of the third housing C3, but invisible from the rear side surface. Then, a first touch panel 38a is provided on the front side of the transparent display 30. A key input device 26 includes a call key, a menu key and an end key, and these keys are provided on the front side surface of the third housing C3.

Furthermore, with referring to FIG. 12(B), a second touch panel 38b is provided on the rear side of the transparent display 30 that is fit into the third housing C3. Furthermore, a proximity sensor 40 is provided on the rear side surface at one end of the longitudinal direction of the third housing C3.

For example, the user inputs a telephone number by performing a touch operation onto the dial key displayed on the transparent display 30, and by the call key, performs a telephone communication operation. Then, if and when the telephone conversation is ended, the user performs the telephone communication ending operation by the end key. The user makes a menu screen displayed on the transparent display 30 by operating the menu key. The user performs a selection and decision of the menu by performing touch operation onto a soft key, etc. that is being displayed on the transparent display 30. Then, by long-depressing the end key, the user turns-on/-off a power of the mobile phone 10.

In addition, the antenna 12, the wireless communication circuit 14, the A/D converter 16, the D/A converter 20, the processor 24, the display driver 28, the flash memory 32, the RAM 34 and the touch panel control circuit 36 are housed within the housing C3, and therefore, not shown in FIG. 12(A) and FIG. 12(B).

Figure 13:
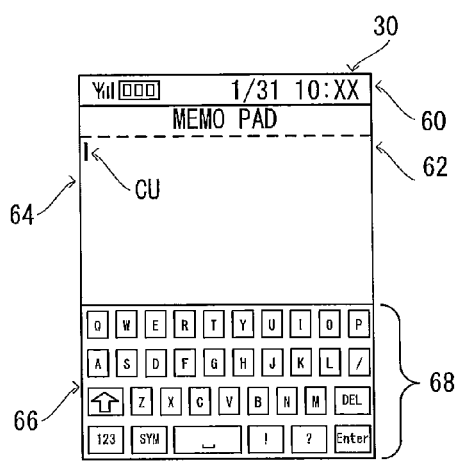
FIG. 13 is a view showing an example of an input screen for a memo pad function that is displayed on the display shown in FIG. 1.

FIG. 13 is a view showing an example of the displaying at a time that a memo pad function is performed. With referring to FIG. 13, a displaying area of the transparent display 30 in a state that the memo pad function is performed includes, as similar to the first embodiment, a status displaying area 60 and a function displaying area 62. In the function displaying area 62 in a state that the memo pad function is performed, an input character displaying region 64 and a soft key displaying region 66 are further included. In the input character displaying region 64, a cursor CU that shows a current input position (an editing position) is displayed. Furthermore, in the soft key displaying region 66, a soft key group 68 including character input keys having a QWERTY arrangement is displayed. The processor 24 displays, if and when a touch operation is performed within the key coordinates range TA corresponding to a character input key, a character corresponding to the character input key is displayed based on a position of the cursor CU.

Figure 14:
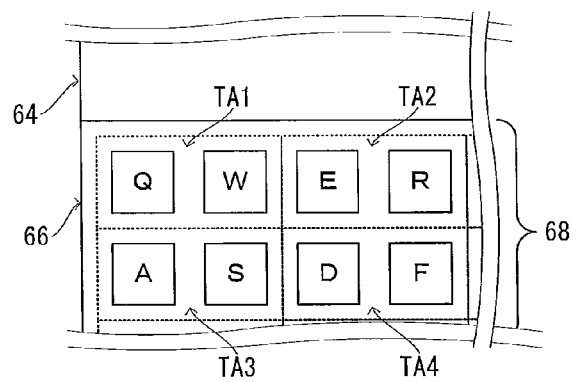
FIG. 14 is a view showing an example of a key coordinates range of a soft key shown in FIG. 13.

FIG. 14 is a view showing the key coordinates range TA of a part of the character input keys. With referring to FIG. 14, a Q key and a W key correspond to the key coordinates range TA1, an E key and an R key correspond to the key coordinates range TA2, an A key and an S key correspond to the key coordinates range TA3, and a D key and an F key correspond to the key coordinates range TA4. Then, in the second embodiment, in a case where a character at a left side of each of the key coordinates range TA is to be input, the user may perform a touch operation within the key coordinates range TA in the first touch panel 38a. In contrast, in a case where a character at a right side is to be input, the user may perform a touch operation within the key coordinates range TA in the second touch panel 38b.

If and when a touch operation is performed to the key coordinates range TA1, for example, from the front side of the transparent display 30 (the first touch panel 38a), "Q" is input. In contrast, if and when a touch operation is performed from the rear side of the transparent display 30 (the first touch panel 38a), "W" is input.

Thus, in the second embodiment as well, by making two character input keys correspond to a single key coordinates range, it is possible to increase an operability at a time that a character is input.

In the second embodiment, two keys horizontally arranged such as Q key and W key correspond to a single key coordinates range TA, but in another embodiment, this is not true. Two keys vertically arranged such as Q key and A key may correspond to a single key coordinates range, or two keys in the vicinity to each other, not horizontally or vertically arranged, may be assigned to a single key coordinates range.

Furthermore, in another embodiment, a key existing at a center and keys existing in circumference thereof may be operated by the first touch panel 38a and the second touch panel 38b. If and when "S" is made to be input from the first touch panel 38a, for example, "A", "W", "D" and "X" become to be input by the second touch panel 38b. In such a case, a key coordinates range for each key is set in a grid-like shape by the first touch panel 38a and the second touch panel 38b.

That is, in the above-described embodiment, the key coordinates range of the center key and the surrounding (upper, lower, left and right in this case) keys can be made larger than displaying ranges of the respective keys. Since the key coordinates range of each key is alternatively arranged in the grid-like shape by the first touch panel 38a and the second touch panel 38b, the key coordinates range of each key may be set larger than the displaying range of each key such that the operating range of the first touch panel 38a and the operating range of the second touch panel 38b are laid on one another.

In addition, it is possible to arbitrarily combine the first embodiment and the second embodiment with each other, and a detailed description is omitted because a specific combination can be easily imagined.

Furthermore, instead of the transparent display 30, a transparent 3D display capable of displaying a 3D image may be adopted so as to make clear difference in depth of the first function key FK and the second function key BK.

Furthermore, a communication system of the mobile phone 10 is a CDMA system, but an LTE (Long Term Evolution) system, a W-CDMA system, a GSM (Registered Trademark) system, a TDMA system, a FDMA system, a PHS system or the like may be adopted.

The plurality of programs used in the embodiments may be stored in an HDD of the server for data distribution, and distributed to the mobile phone 10 via the network. The plurality of programs may be stored in a storage medium such as an optical disk of CD, DVD, BD (Blu-ray Disc) or the like, a USB memory, a memory card, etc. and then, such the storage medium may be sold or distributed. In a case where the plurality of programs downloaded via the above-described server or storage medium are installed to a mobile phone having the structure equal to the structure of the embodiments, it is possible to obtain advantages equal to the advantages according to the embodiments.

Furthermore, the above-described embodiments may be adapted not only to the mobile phone 10 but also a so-called smartphone and a PDA (Personal Digital Assistant).

An embodiment is a mobile terminal comprising: a transparent display; a first touch panel that is provided on the display; a second touch panel that is provided on a rear side opposite to a side that the first touch panel is provided; a detecting module operable to detect a touch operation to the first touch panel or the second touch panel; a first performing module operable to perform a first function if and when the touch operation is made to the first touch panel; and a second performing module operable to perform a second function if and when the touch operation is made to the second touch panel.

In the embodiment, the mobile terminal (10: a reference numeral exemplifying a corresponding module in the embodiment, and so forth) is provided with the display (30) that is transparent in a state that nothing is being displayed, and therefore, it is possible to look at a rear through the display. The first touch panel (38a) is provided on a front side of the display, and on a rear side thereof, the second touch panel (38b) is provided, for example. The detecting module (36) detects a touch operation to the first touch panel and the second touch panel that are provided on the front side and the rear side of the display, respectively. The first performing module (24, S31) performs the first function (a telephone function, etc., for example) if and when the touch operation is made to the first touch panel provided on the front side of the display. In contrast, the second performing module (24, S35) performs the second function (a map function, etc., for example) if and when the touch operation is made to the second touch panel provided on the rear side of the display.

According to the embodiment, by providing touch panels on both sides of the display, it is possible to increase an operability of each touch panel.

Another embodiment is the mobile terminal further comprising a key displaying module operable to display, on the display, at least one of a first function key corresponding to the first touch panel and a second function key corresponding to the second touch panel, wherein the first performing module performs the first function if and when a touch input is performed to the first function key and the second performing module performs the second function if and when a touch input is performed to the second function key.

In this embodiment, the key displaying module (24, S21) displays the first function key (FK) to which a telephone function or the like is made to correspond and the second function key (BK) to which a map function or the like is made to correspond. Then, if and when a touch input is performed to the first function key by using the first touch panel, the first function is performed. On the other hand, if and when a touch input is performed to the second function key by using the second touch panel, the second function is performed.

According to this embodiment, by using two touch panels provided at the both sides of the display, it is possible to increase an operability of each key even if a plurality keys are displayed in a narrower displaying range.

A further embodiment is the mobile terminal, wherein the second function key is displayed, being arranged at a deeper side with respect to the first function key in viewed from the user.

In the further embodiment, the key displaying module displays the two keys in such a manner that the first function key (FK) is laid on the second function key.

According to the further embodiment, by displaying the first function key and the second function key so as to have a depth, it is possible to make the user to intuitively recognize a surface (direction) to be touch-operated.

A still further embodiment is the mobile terminal, wherein a character string indicative of a function of the second function key is displayed in the vicinity of the second function key.

According to the still further embodiment, the user can clearly recognize a function that is made to correspond to the second function key.

A yet further embodiment is the mobile terminal further comprising a housing that has a display, a proximity sensor that is provided on a surface that the second touch panel is provided, and an invalidating module that invalidates the second performing module if and when a proximity of an object to be sensed (a hand, finger, etc., for example) is sensed.

In the yet further embodiment, the display is fit to the housing (C1, C2) in such a manner that a glass plate is fit in a pane. The proximity sensor (40) is provided on the surface that the second touch panel is provided. The invalidating module (24, S3) invalidates the performing module if and when the mobile terminal is held in a manner that the proximity sensor is covered and hidden.

According to the yet further embodiment, it is possible to prevent an erroneous operation even if the mobile terminal is held in a state that there is a higher possibility that an erroneous operation occurs.

The other embodiment is a touch panel operating method in a mobile terminal (10) which comprises a transparent display (30); a first touch panel (38a) provided on the display; a second touch panel (38b) that is provided on a rear side of the display; and a detecting module (36) operable to detect a touch operation to the first touch panel or the second touch panel, comprising steps of: displaying (S21) a key (FK, BK) on the display; and at a time that a touch operation is made to the key, performing (S31, S35) a first function if and when the touch operation is made to the first touch panel or a second function if and when the touch operation is made to the second touch panel.

According to the other embodiment, as well, by providing touch panels on both sides of the display, it is possible to increase the operability of each touch panel.

Although the present invention has been described and illustrated in detail, it is clearly understood that the same is by way of illustration and example only and is not to be taken by way of limitation, the spirit and scope of the present invention being limited only by the terms of the appended claims.

DESCRIPTION OF NUMERALS 10 denotes a mobile phone,
24 denotes a processor,
26 denotes a key input device,
32 denotes a flash memory,
34 denotes a RAM,
36 denotes a touch panel control circuit,
38a denotes a first touch panel
38b denotes a second touch panel, and
40 denotes a proximity sensor.

The invention claimed is:

1. A mobile terminal, comprising:
a transparent display;
a first touch panel that is provided on a first side of the transparent display;
a second touch panel that is provided on a second side of the transparent display that is opposite to the first side on which the first touch panel is provided; and
one or more modules that,
for each of a plurality of coordinate ranges of the transparent display, display overlapping representations of a pair of functions on the transparent display within the coordinate range, wherein each pair of functions comprises a first function and a second function, wherein the overlapping representations of a pair of functions comprise a first function key and a second function key that is different than the first function key, and wherein the first function key is overlaid over a portion of the second function key such that both the first function key and the second function key are visible to a user from the first side and the second side of the transparent display,
detect a touch operation to the first touch panel or the second touch panel, and,
when the touch operation is made within one of the plurality of coordinate ranges,
whenever the touch operation is made to the first touch panel, execute the first function from the pair of functions indicated within the one coordinate range, and,
whenever the touch operation is made to the second touch panel, execute the second function from the pair of functions indicated within the one coordinate range.

2. A mobile terminal according to claim 1, wherein each of the overlapping representations of a pair of functions comprises a character string indicative of the first function and a character string indicative of the second function.

3. A mobile terminal according to claim 1 further comprising:
a housing that houses the transparent display; and
a proximity sensor that is provided on a side of the housing on which the second touch panel is provided,
wherein the one or more modules invalidate a touch operation made on the second touch panel when a proximity of an object is sensed by the proximity sensor.

4. A touch panel operating method in a mobile terminal which comprises a transparent display, a first touch panel provided on a first side of the transparent display, and a second touch panel provided on a second side of the transparent display that is opposite to the first side, wherein the method comprises:
for each of a plurality of coordinate ranges of the transparent display, displaying overlapping representations of a pair of functions on the transparent display within the coordinate range, wherein each pair of functions comprises a first function and a second function, wherein the overlapping representations of a pair of functions comprise a first function key and a second function key that is different than the first function key, and wherein the first function key is overlaid over a portion of the second function key such that both the first function key and the second function key are visible to a user from the first side and the second side of the transparent display;
detecting a touch operation to the first touch panel or the second touch panel; and, when the touch operation is made within one of the plurality of coordinate ranges,
    whenever the touch operation is made to the first touch panel, execute the first function from the pair of functions indicated within the one coordinate range, and,
whenever the touch operation is made to the second touch panel, execute the second function from the pair of functions indicated within the one coordinate range.

* * * * *